(12) United States Patent
Bueno Colina

(10) Patent No.: US 8,287,619 B2
(45) Date of Patent: Oct. 16, 2012

(54) PROCESS AND EQUIPMENT FOR THE PRODUCTION OF DIRECT REDUCED IRON AND/OR PIG IRON FROM IRON ORES HAVING A HIGH-PHOSPHORUS CONTENT

(75) Inventor: Henry Rafael Bueno Colina, Puerto Ordaz (VE)

(73) Assignee: C.V.G. Ferrominera Orinoco C.A., Puerto Ordaz (VE)

( * ) Notice: Subject to any disclaimer, the term of this patent is extended or adjusted under 35 U.S.C. 154(b) by 115 days.

(21) Appl. No.: 12/795,743

(22) Filed: Jun. 8, 2010

(65) Prior Publication Data

US 2011/0296949 A1    Dec. 8, 2011

(51) Int. Cl.
*C22B 3/22* (2006.01)
*C22B 3/12* (2006.01)

(52) U.S. Cl. ....... 75/430; 423/150.1; 423/140; 423/505; 210/724

(58) Field of Classification Search ............ 75/430; 423/150.1, 140, 505; 210/724
See application file for complete search history.

(56) References Cited

U.S. PATENT DOCUMENTS

| | | | | |
|---|---|---|---|---|
| 3,374,087 A | * | 3/1968 | Gray | 75/450 |
| 3,591,363 A | * | 7/1971 | Campbell | 75/444 |
| 3,637,369 A | * | 1/1972 | Sebenik et al. | 75/447 |
| 3,928,024 A | * | 12/1975 | Mueller et al. | 423/157.2 |
| 4,045,214 A | * | 8/1977 | Wetzel et al. | 75/446 |
| 4,566,975 A | * | 1/1986 | Allgulin | 210/711 |

FOREIGN PATENT DOCUMENTS

BR    PI 0401372-7 A    * 11/2005

OTHER PUBLICATIONS

Resende et al. BR 200401372 A, published Nov. 16, 2005, Derwent ACC-No. 2006-011052. Abstract.*
"Potassium Hydroxide". Handbook of Chemistry and Physics Web Edition. http://www.hbcpnetbase.com/tables/default.asp. downloaded Feb. 3, 2012.*
"Sodium Hydroxide". Handbook of Chemistry and Physics Web Edition. http://www.hbcpnetbase.com/tables/default.asp. downloaded Feb. 3, 2012.*
Magela da Costa, Gerald, et al. "Process for Removal of Phosphorus in Iron Ore [Processo Para Remocao de Fosfor em Minerios de Ferr]". PI 0401372-7, published Nov. 16, 2005. Written translation.*

* cited by examiner

Primary Examiner — George Wyszomierski
Assistant Examiner — Tima M McGuthry Banks
(74) Attorney, Agent, or Firm — Bachman & LaPointe, P.C.

(57) ABSTRACT

A process and apparatus for refining iron from high-phosphorus content iron ores. The process involves mixing a high-phosphorus iron oxide ore and an alkaline solution of pH between about 12.5 and 13.5, screening the mixture by gravity to separate an alkaline-high-phosphorus solution from a low-phosphorus iron ore; and treating the low-phosphorus iron ore with lime and a natural gas.

23 Claims, 2 Drawing Sheets

PROCESS AND EQUIPMENT FOR THE PRODUCTION OF DIRECT REDUCED IRON AND/OR PIG IRON FROM IRON ORES HAVING A HIGH-PHOSPHORUS CONTENT

BACKGROUND OF THE INVENTION

This invention relates to direct reduced iron (DRI), more particularly, to the process, method and apparatus for the production of direct reduced iron and/or pig iron from iron ores having a high-phosphorus content. The method and apparatus according to this invention provide an effective process for reducing phosphorus in iron ores, making them suitable for use in processes for the direct reduction of iron ores. The low-phosphorus content iron ore can be used in steel making, for instance the ore can be used as a raw material in electric arc steelmaking process or may be melted down to produce pig iron in electric reducing or cupola furnaces.

The direct reduction of iron oxide in forms, such as lumps or pieces of variable ore particle sizes, to metallic iron in the solid state has become a commercial reality throughout the world in the last thirty years. The combined annual capacity of the direct reduction plants currently in operation exceeds fifty million metric tons of direct reduced iron. DRI is mainly used as a raw material for the manufacture of steel in electric arc furnaces. It is expected that the world demand for direct reduced iron will increase substantially over the next few years as additional electric arc furnace steel manufacturing plants are built.

There are difficulties associated in the removal of phosphorus from the iron oxide matrix. Many of the same process for the concentration of iron also concentrate phosphorus. Known processes for the direct reduction of iron oxide to metallic iron start with iron ore and/or ore lumps having a predetermined phosphorus content of less than or about 0.05%. Since phosphorus is directly associated with iron in the iron ore matrix, iron ore with concentrations of phosphorus greater than about 0.05% are unsuitable for the production of direct reduced iron. As a result, large stockpiles of crude iron ore with a high-phosphorus content and a high total iron content accumulate at ore working sites and cannot be delivered. The difficulty in separating phosphorus from the crude iron ore creates large reserves of crude iron ore that cannot be used to produce steel in electric steel making furnaces and/or pig iron furnaces.

SUMMARY OF THE INVENTION

It is desirable to provide a method for producing direct reduced iron (DRI) and/or pig iron from iron ores with a high-phosphorus content. The produced ore can be utilized as a feed for direct reduction processes. The resultant reduced iron ore product is suitable for electric steelmaking furnaces and pig iron production furnaces.

The primary object of the present invention is the separation of phosphorus from iron ores having a high-phosphorus content by mixing high-phosphorus iron ores with an alkaline solution.

It is a further object of the present invention to provide a process for refining iron from high-phosphorus content iron ores comprising the steps of: mixing a high-phosphorus iron oxide ore and an alkaline solution of pH between about 12.5 and 13.5, wherein a mixture of an alkaline-high-phosphorus solution and a low-phosphorus iron ore solid are obtained; screening the mixture by gravity to separate the alkaline-high-phosphorus solution from the low-phosphorus iron ore; diluting the alkaline-high-phosphorus solution to a pH of between about 11.5 and 12.5, wherein a high-phosphorus solid precipitates from a first diluted alkaline solution; and, treating the low-phosphorus iron ore with a natural gas.

It is still a further object wherein the treating step is omitted from the present invention and the present invention includes a liming step comprising adding quicklime, hydrated lime, calcium carbonate or mixtures thereof to the low-phosphorus iron ore; feeding the limed low-phosphorus iron ore to a reduction reactor; and, contacting the limed low-phosphorus iron ore with a natural gas to produced a reduced iron ore.

It is a further object of the present invention to create an apparatus for refining iron from high-phosphorus content iron ores comprising: a rotary reactor for mixing a high-phosphorus iron ore and an alkaline solution of pH between about 12.5 and 13.5; a grid settler for gravity separation of low-phosphorus iron ore solid and an alkaline-high-phosphorus solution; a diluting station, wherein water is added to the alkaline-high phosphorus solution to precipitate a high-phosphorus solid from a first diluted alkaline solution; a filter to separate the high-phosphorus solid from the first diluted alkaline solution; a screening station to wash the low-phosphorus iron ore solid with water, wherein a low-phosphorus iron ore solid is separated from a second diluted alkaline solution containing fine particles of low-phosphorus iron ore solid; a filter to separate the fine particles of low-phosphorus iron ore solid from the second diluted alkaline solution; an evaporator for reducing the water content in the first and second diluted alkaline solutions to create an evaporated alkaline solution; a mixing station to concentrate the evaporated alkaline solution to a pH of between about 12.5 and 13; and, a recycle feed for recycling the alkaline solution of pH between about 12.5 and 13 to the rotary reactor.

Also in accord with the present invention the apparatus for refining iron from high-phosphorus content iron ores further comprises: a conveyor belt; a prereduction reactor comprising a drying station, a heating station and a natural gas feeder, wherein the conveyor belt feeds the low-phosphorus iron ore to the prereduction reactor, a reduction reactor comprising a natural gas feeder and a heater; and, a magnetic field, wherein the magnetic field is about 100 to 200 gauss.

BRIEF DESCRIPTION OF THE DRAWINGS

A detailed description of preferred embodiments of the present invention follows, with reference to the attached drawings, wherein.

DETAILED DESCRIPTION

Figure 1:
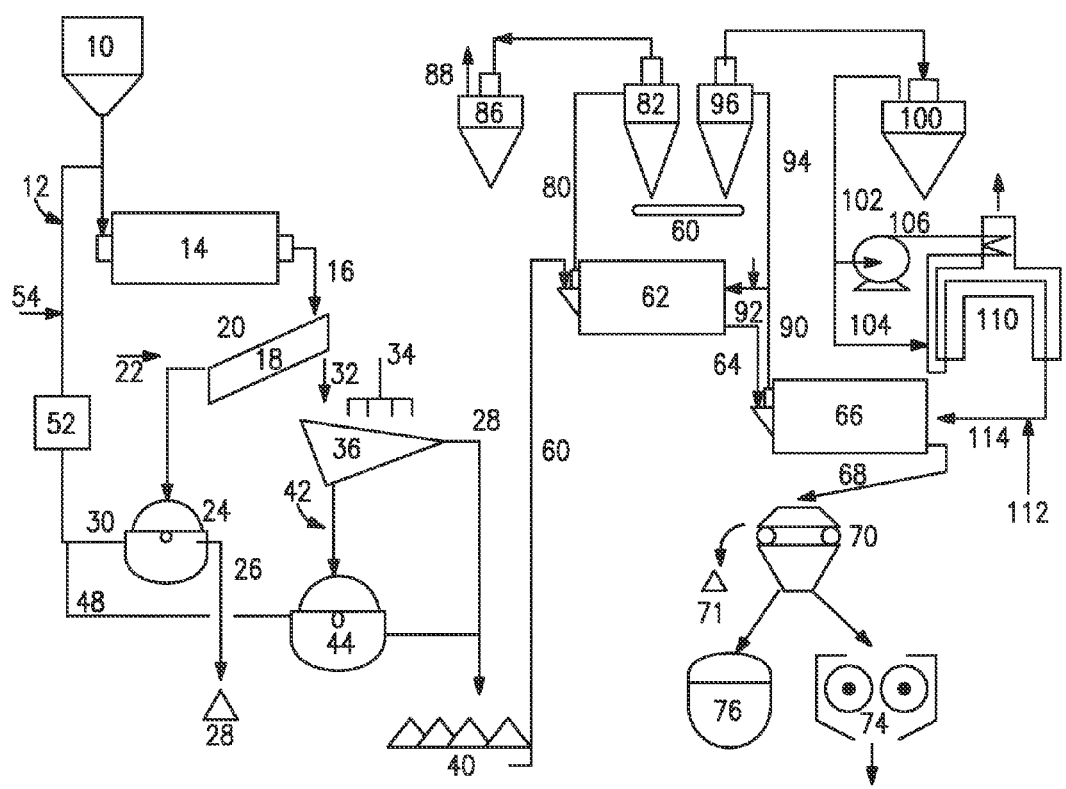
FIG. 1 diagrammatically depicts the apparatus for the production of DRI from iron ores having a high phosphorus content of the present invention.

The invention relates to direct reduced iron (DRI), more particularly, to the process, method and apparatus for producing direct reduced iron (DRI) and/or pig iron from iron ores having a high-phosphorus content. High phosphorus iron ore is mixed with an alkaline solution to separate the low-phosphorus iron ore from an alkaline-high phosphorus solution. The resultant low-phosphorus iron ore is then reduced. The reduced iron ore is suitable as a feed for electric arc furnace steelmaking processes and/or pig iron production process Hereinafter the term "DRI" is used to refer to direct reduced iron. DRI is an alternative iron source produced by heating an iron ore at a temperature high enough to burn off its carbon and oxygen content but below iron's melting point of 1535° C. (2795° F.). The output is sold as pellets or briquettes (HBI) and contains from 90 to 97 percent pure iron, the rest being mainly carbon with trace amounts of other impurities. DRI is further refined in a furnace for conversion into steel.

Hereinafter the term "pig iron" is used to refer to a semi-finished metal produced from iron ore in a blast furnace. The output contains about from 92 to 94 percent iron, high amounts of carbon typically from 2.0 to 4.0 percent with the balance consisting of mostly manganese and silicone plus small amounts of phosphorus, sulfur, and other impurities. Pig iron is further refined in a furnace for conversion into steel.

For the purposes of this invention, the terms "DRI" and "pig iron" (also known as "metallics") may be used interchangeably.

The method and apparatus for reducing the phosphorus content of iron ore starts with the step of leaching the ore with an alkaline solution of high pH and/or a calcium oxide leaching agent. The high pH solution reduces the phosphorus content of the iron ore to produce low-phosphorus iron ore that is acceptable for using in direct reduced iron processes and/or pig iron production processes that is utilized in electric arc furnace steelmaking processes.

Iron ore with a high phosphorus content is obtained from mining facilities. The initial iron ore with high-phosphorus content may be composed of variable particle sizes ranging from about 100 microns to about 5 millimeters. The phosphorus content of the initial high phosphorus iron ore is from about 0.06% to about 0.17%. The initial high phosphorus iron ore of variable particle size is placed in a rotary reactor/mixer with an alkaline solution of high pH. The pH of the solution is about 12 or higher. The solution is present in a ratio of between 1 to 2 $m^3$/ton of ore, preferably in a ratio of one ton of iron oxide per cubic meter of alkaline solution to three tons of iron oxide per cubic meter of alkaline solution.

The rotary reactor/mixer may be any mixing device that is well known within the art, such as a rotary drum or a rotary kiln.

After mixing, the next stage in the process is screening the phosphorus-free/low phosphorus ores with process water in a vibratory screen. A sliding grid settler separates the leaching alkaline solution from the ore. The alkaline solution flows through a filtration system for cleaning and is then recycled back to the reactor/mixer. Ready for use on the next initial high-phosphorus iron ore batch/sample.

The alkaline solution may be composed of sodium hydroxide, ammonia hydroxide, potassium hydroxide, an amine and mixtures thereof. The screen mesh may be of any appropriate size that is well known within the art, such as about 100 micron. The filtration system may be any filtration system that is well known within the art, such as a centrifugal system or a vacuum system. The sliding grid settler may be any settler that is well known within the art, such as a simple decanter or a baffled decanter.

FIG. 1 illustrates the apparatus and process of converting high-phosphorus iron ore into DRI and/or Pig Iron. The apparatus comprises a hopper (10) that receives the high phosphorus iron oxides of variable particle size. The high-phosphorus iron oxide is fed from hopper (10) to the rotary reactor/mixer (14). The alkaline solution is introduced to the system through feed line (12). Line (12) feeds the alkaline solution to mixer (14). The high-phosphorus iron ore and the alkaline solution are mixed. Upon contact with the alkaline solution, the phosphorus in the iron oxide matrix dissolves into the solution. The phosphorus within mixer (14) liquefies, i.e. the phosphorus compounds are leached out by the alkaline solution. To leach out as much of the phosphorus as possible, the mixture is left in the reactor/mixer (14) for between 10 and 20 minutes, preferably 12 to 16 minutes. If the mixing time is not long enough, the maximum amount of phosphorus will not achieve liquidity. If the mixing time is too long, the equipment and/or solution used are not of the appropriate size, quantity, quality or concentration. The mixing is performed in order to obtain results of 0.8 kg of iron ore/$m^2$ s to about 2.0 kg of iron ore/$m^2$ s. The alkaline solution is at a pH between 12.5 and 13.5, preferably between 12.5 and 13. It is not economical to use an alkaline solution with a pH higher than about 13; however, if the pH of the alkaline solution is too low the phosphorus will remain a solid within the iron matrix.

Continuing on FIG. 1, after the reactor (14) the mixture passes via line (16) to a sliding grid settler (18). The low phosphorus iron ore solid is separated from the solution by gravity. The solution with a high-phosphorus content leaves the settler via (20). To reduce the pH to between 11.5 and 12.5, water is added to the high-phosphorus solution through line (22). The water is added in a magnitude of 5 to 10 cubic meters of water per ton of iron ore solid. The reduction in pH ensures that the phosphorus compounds will precipitate out of the first diluted alkaline solution. The phosphorus compounds are separated from the first diluted alkaline solution in a centrifugal filter (24). The phosphorus solids and the phosphorus compounds are then stored in (28) via line (26). The phosphorus solids and phosphorus compounds can be used for any application that they may be suitable, such as fertilizers or in the production of high-phosphorus pig iron.

From the gravity settler the partly or wholly phosphorus-free low-phosphorus iron ore leaves via line (32) and is then delivered to screen (36) where it is washed with process water delivered by line (34). The phosphorus content of the low-phosphorus iron ore is from about 0.03% to about 0.06%. The second diluted alkaline solution containing fine particles of low-phosphorus iron ore is sent to a centrifugal filter (44) via line (42). The fine particles of low-phosphorus iron ore are separated from the second diluted alkaline solution. The low-phosphorus iron ore retained on screen (36) and the low-phosphorus iron ore particles retained after filtration (44) are delivered to storage yard (40) via line (28). The low-phosphorus iron ore in storage yard (40) is now ready for reduction to create DRI.

Continuing on FIG. 1, the first and second diluted alkaline solutions leave filters (24) and (44) via lines (30) and (48). The watered down solutions are delivered to an evaporator (52) via line (50). In the evaporator (52) the watered down solutions are concentrated removing water by evaporation and via line (54) the solutions are mixed with fresh alkaline solution. Once mixed and concentrated to a pH of between 12.5 and 13.5, preferably between 12.5 and 13 the fresh alkaline solution restarts the cycle by entering the system through feed line (12).

The partly phosphorus-free low-phosphorus iron ore is then fed from storage (40) through line (60) to a direct reduction system to remove the oxygen. Reducing agents, such as hydrogen and carbon monoxide, which are obtained by reforming natural gas on the partly-reduced bed of iron itself are used in the reduction system.

Specifically referring to FIG. 1, the low-phosphorus iron ore stored in (40) is fed to the direct reduction system via conveyor belt (60) to prereduction reactor (62). In prereduction reactor (62) the material is dried, preheated and prereduced, removing between about 30 to about 50% of the oxygen through the action of the reducing gas, which enters via (92). The reducing gas may be any natural gas that is well known within the art, such as hydrogen, carbon monoxide and mixtures thereof. The reduction reactor may be any reduction reactor that is well known within the art, such as a rotary furnace. The prereduced material is then transferred via duct (64) to reduction reactor (66) where up to about 90 to 97% of the oxygen is removed through the action of the reforming natural gas, wherein reducing gas generated in the reactor (66) itself on the hot surface of the reduced material when hot feed gas entering via flow (114) is placed in contact with the hot surface.

The reduced material leaves the reactor (66) at a temperature between about 500° C. and about 700° C. via (68) and is then passed through a magnetic field (70). If the temperature is too low, the material will not reduce. If the temperature is too high, the material will cluster together making separation through magnetic field difficult. The magnetic field (70) strength is between about 100 and about 200 gauss. If the strength of the magnetic field is too low, the magnetic material will not separate out. If the strength of the magnetic field is too high, the non-magnetic material may clump to the magnetic material making separation of the non-magnetic material difficult. The non-magnetic material is separated out and accumulated in (71) for subsequent mixing with the phosphorus compounds stored in (28). The separated out non-metallic material and phosphorus compounds are then used either for the production of high-phosphorus pig iron and/or as an additive in the production of fertilizer. The product is either delivered to a briquetting machine (74) or fed directly to a melting furnace (76).

The exhaust gas leaving the prereduction reactor via duct (80) is fed to cyclone (82) to remove dust particles carried over and is then fed to scrubber (86) to cool it, wash it and make it available as a fuel via line (88). The scrubber (86) may be any scrubber that is well known within the art, such as a venture scrubber, water-jet scrubber or combinations thereof. The gas leaving reduction reactor (66) via line (90) is divided into two portions, about a 30 to 40% portion equivalent to between about 400 and 800 nm$^3$/t of reduced product goes to the prereduction reactor via line (92), and about another 60 to 70% portion equivalent to between about 800 and 1400 nm$^3$/t of reduced product is recycled through line (94). The line (94) gas is fed to cyclone (96) to remove dust particles carried over and is then fed to scrubber (100) to cool it, wash it and deliver it to gas compressor (106) via line (102). Before entering compressor (106), some of the gas between about 200 and 400 nm$^3$/t of reduced product is drawn off as fuel to feed the burners via line (104). The compressed gas leaving the compressor at a pressure of between about 1 and 3 bar is fed to preheater (110) to raise its temperature to between about 700 and 900° C. Oxygen or air enriched with oxygen is injected into the preheated gas via line (112) to raise the temperature to between about 900 and 1150° C. so that the feed gas entering the reactor via line (114) contains sufficient energy to carry out the reactions in the reduction and prereduction reactors. If the temperature is too low, the feed gas will not have sufficient energy to carry out the reduction. If the temperature is too high, the material will cluster together making reduction difficult. If the pressure of the gas is too low the feed gas will not have sufficient energy to carry out the reactions. The reforming and reduction reactions are difficult to perform if the gas pressure is too high.

In an additional non-limiting embodiment, quicklime, hydrated lime, calcium carbonate, the like and mixtures thereof are added to the low-phosphorus iron ore before it is fed to the reduction system so that part of the remaining phosphorus is removed by diffusion from the iron to the lime. The lime is added in a proportion of about 0.1 to about 0.3% of the weight of ore. If too little lime is added, sufficient amounts of phosphorus will not be removed. Care is taken to not add too much lime because too much lime will affect the outcome of the reduction reaction. Part of the phosphorus-impregnated lime is carried off by the gases and is trapped in the scrubber by the flue gases leaving the reduction system.

According to this embodiment the flue gas leaves the reduction system with a lime concentration of between about 5 and 15 g/nm$^3$ of gas at a temperature of between about 300 and 500° C. The flue gas is cooled to between about 30 and 40° C. in a cooling scrubber and returned to the system through the action of a compressor. After compression the flue gas is enriched with a flow of natural gas of between about 0.1 and 0.2 nm$^3$ of natural gas/nm$^3$ of flue gas. The mixture of flue gas and natural gas is called feed gas and is preheated to a temperature of between about 700 and 900° C. in a preheater. Air and/or oxygen are injected into the hot feed gas to raise its temperature to between about 900 and 1150° C. The elevated temperature gas is then fed to the reduction system where the methane and heavy hydrocarbons present in the natural gas are converted to hydrogen and carbon monoxide that react with the iron oxide, removing the oxygen and concentrating the iron.

After reduction, the direct reduced iron product is then passed through a magnetic field between about 100 and 200 gauss to separate out the remainder of the lime, which has not been carried over by the gases. The non-magnetic material separated from the direct reduced iron and the lime trapped in the scrubber are mixed with the high-phosphorus precipitate for use in other applications such as the production of pig iron having a high-phosphorus content, or prepared for fertilizer. The direct reduced iron that is free of lime can then be directly fed to a steelmaking furnace or a furnace for the production of pig iron, or may be stored for subsequent uses. This method produces a direct reduction in which the partly or wholly phosphorus-free (low-phosphorus) iron ore is converted into direct reduced iron.

Other advantages of this invention will be apparent from the following example:

EXAMPLE

Figure 2:
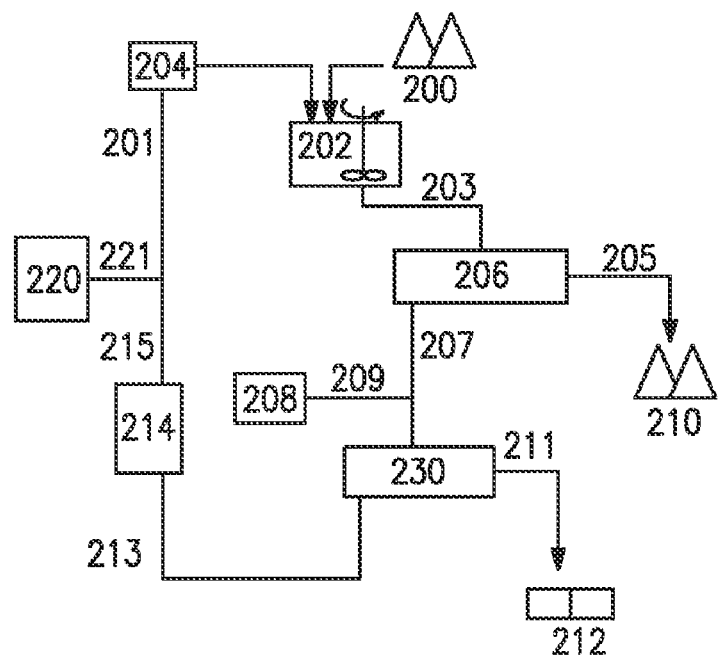
FIG. 2 diagrammatically depicts a non-limiting embodiment of simplified production of low-phosphorus iron ores from high-phosphorus iron ore of the present invention; and, FIG. 3 diagrammatically depicts a non-limiting embodiment involving the reduction of the low-phosphorus iron ore.
Figure 3:
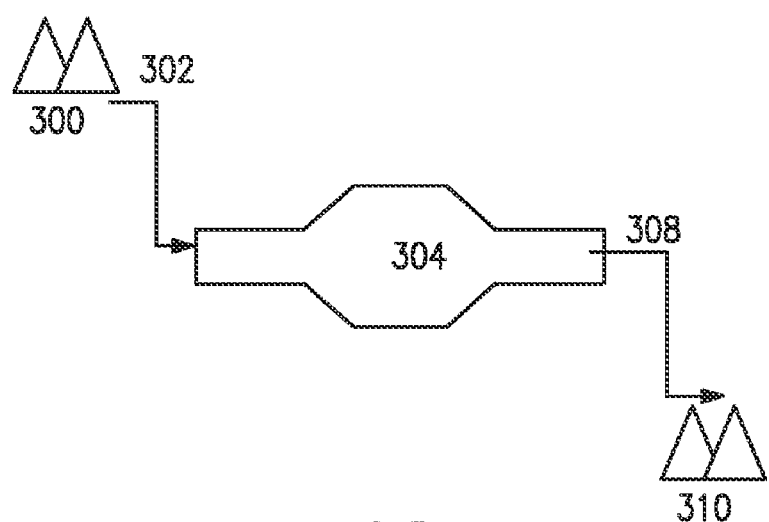

In order to demonstrate the advantages of the method and apparatus according to this invention a complete method including the apparatus is disclosed in FIG. 1. FIG. 2 diagrammatically depicts a simplification of the steps needed for the removal of phosphorus from iron ores by the method according to this invention. FIG. 3 diagrammatically depicts a non-limiting embodiment involving the reduction of the produced low-phosphorus iron ore.

As depicted in FIG. 2, according to this process iron ore having a high-phosphorus content (200) of 0.14% was added to a vessel (202) and mixed with an alkaline solution of sodium hydroxide (204) at a pH of 13. The solution was stirred for a period of ten minutes and the mixture (203) was filtered with filter paper (206). The low-phosphorus solid iron ore (205) was separated from the high-phosphorus alkaline solution (207). The percent of phosphorus in the ore (210) found on the filter paper was determined to be 0.04%, as indicated Table I below. The high-phosphorus alkaline solution (207) is diluted with water (208) poured (209) into the solution. As the pH drops, the phosphorus within the solution begins to precipitate out. The solution is filtered (210) to remove the phosphorus solids and compounds (212) from the diluted alkaline solution (213). The diluted alkaline solution (213) is heated to evaporate (214) water. The concentrated alkaline solution (215) is then treated with additional alkaline (220) via line (221) until an alkaline solution of about a pH of 13 obtained, then the solution (201) is recycled as the initial alkaline solution (204).

Following the procedure illustrated in FIG. 2, iron ore having a high-phosphorus content of 0.14% is added to the vessel. After treatment as illustrated above, the percent of phosphorus in the ore found on the filter paper was determined to be 0.04%.

As illustrated in the test procedures above, the percent of phosphorus removed from the initial iron ore sample is from about 40% P to about 80% P.

In FIG. 3, 1% of lime was added to the low-phosphorus iron ore obtained (300). The ore (300) was transferred (302) directly to a rotary furnace (304). Once the sample cooled (308), it was determined to contain 0.052% phosphorus, as in Table I below. Table I presents X-ray diffraction analysis on an initial sample of high-phosphorus iron ore, a FIG. 2 treatment of a sample of low-phosphorus iron ore with alkaline solution and a low-phosphorus sample produced by direct reduction through the use of a liming agent. The diffraction analysis reveals the reduction in phosphorus content after the treatment described in this invention, thus demonstrating the effect and novelty of the method according to this invention.

TABLE I

RESULTS FOR THE EXAMPLE

| SAMPLE | COMPOUNDS IDENTIFIED |
| --- | --- |
| Sample of ore having a high-phosphorus content (0.14% P) | Hematite ($Fe_2O_3$)<br>Iron acid phosphate ($Fe_3(H_2PO_3)$)<br>Goethite ($Fe(OH)$)<br>Vivianite ($Fe_3(PO_4)_2(8H_2O)$)<br>Silica ($SiO_2$)<br>Epidote ($Ca_2$—$FeAl_2Si_3O_{12}(OH)$)<br>Aluminum phosphate ($AlPO_4$) |
| Sample of ore treated with alkaline solution (0.04% P) | Hematite ($Fe_2O_3$)<br>Vivianite ($Fe_3(PO_4)_2(8H_2O)$)<br>Silica ($SiO_2$) |
| Reduced ore sample (0.052% P) | Goethite ($Fe(OH)$)<br>Wustite ($FeO$)<br>Vivianite ($Fe_3(PO_4)_2(8H_2O)$)<br>Iron Fe |

The process and apparatus for the direct reduction of high-phosphorus iron ore of the present invention may be implemented in other possible applications. The process of the present invention may be applied to conventional metallurgic technology, chemical manufacturing, and any application that may benefit from the separation and reduction properties of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications, which are within its spirit and scope as defined by the claims.

What is claimed:

1. A process for refining iron from high-phosphorus content iron ores comprising the steps of:
    mixing a high-phosphorus iron oxide ore and an alkaline solution of pH between about 12.5 and 13.5, wherein a mixture of an alkaline-high-phosphorus solution and a low-phosphorus iron ore solid are obtained;
    screening the mixture by gravity to separate the alkaline-high-phosphorus solution from the low-phosphorus iron ore;
    diluting the alkaline-high-phosphorus solution to a pH of between about 11.5 and 12.5, wherein the diluting step comprises the steps of:
        adding water to the alkaline-high-phosphorus solution to form a diluted alkaline-high-phosphorus solution;
        filtering the diluted alkaline-high-phosphorus solution to separate a precipitated high-phosphorus solid from the diluted alkaline-high-phosphorus solution to form a first diluted alkaline solution;
        evaporating the first diluted alkaline solution, wherein the evaporation concentrates the first diluted alkaline solution to form a concentrated first diluted alkaline solution;
        adding fresh alkaline to the concentrated first diluted alkaline solution to form a second alkaline solution of pH of between about 12.5 and 13.5 is reached; and,
        recycling the second alkaline solution of pH between about 12.5 and 13.5 in the mixing step; and,
    treating the low-phosphorus iron ore with a natural gas.

2. The process for refining iron from high-phosphorus content iron ores of claim 1, wherein the alkaline solution is present in a ratio of one ton of high-phosphorus iron oxide ore per cubic meter of alkaline solution to three tons of high-phosphorus iron oxide ore per cubic meter of alkaline solution.

3. The process for refining iron from high-phosphorus content iron ores of claim 1, wherein the alkaline solution is present in a ratio of two tons of high-phosphorus iron oxide ore per cubic meter of alkaline solution.

4. The process for refining iron from high-phosphorus content iron ores of claim 1, wherein the high-phosphorus iron oxide ore has a phosphorus content of greater than 0.05%.

5. The process for refining iron from high-phosphorus content iron ores of claim 1, wherein the alkaline solution has a pH range of between about 12.5 and 13.

6. The process for refining iron from high-phosphorus content iron ores of claim 1, wherein the alkaline solution is selected from the group consisting of sodium hydroxide, ammonia hydroxide, potassium hydroxide, an amine and mixtures thereof.

7. The process for refining iron from high-phosphorus content iron ores of claim 1, wherein the mixing step is performed for 10 to 20 minutes.

8. The process for refining iron from high-phosphorus content iron ores of claim 1, wherein the mixing step is performed for about 12 to about 16 minutes.

9. The process for refining iron from high-phosphorus content iron ores of claim 1, wherein the low-phosphorus iron ore has a phosphorus content of about 0.03 to about 0.06.

10. The process for refining iron from high-phosphorus content iron ores of claim 1, wherein a plurality of screening steps and diluting steps are performed.

11. The process for refining iron from high-phosphorus content iron ores of claim 1, wherein the treating step comprises:
    feeding the low-phosphorus iron ore to a prereduction reactor, wherein the low-phosphorus iron ore is dried and preheated;
    contacting the dried and preheated low-phosphorus iron ore with the natural gas, wherein up to about 30-50% of oxygen is removed to form a prereduced low-phosphorus iron ore;
    feeding the prereduced low-phosphorus iron ore to a reduction reactor; and, contacting the prereduced low-phosphorus iron ore with the natural gas in the reduction reactor to produce a reduced iron ore, wherein up to about 90 to 97% of the oxygen is removed.

12. The process for refining iron from high-phosphorus content iron ores of claim 11, wherein the treating step further comprises the step of passing the reduced iron ore through a magnetic field.

13. The process for refining iron from high-phosphorus content iron ores of claim 12, wherein the magnetic field is between about 100 and 200 gauss.

14. The process for refining iron from high-phosphorus content iron ores of claim 11, wherein the reduced iron ore leaves the reduction reactor at a temperature of about 500 to 700° C.

15. The process for refining iron from high-phosphorus content iron ores of claim 11, wherein the temperature of the reduction reactor is about 900 to 1150° C.

16. The process for refining iron from high-phosphorus content iron ores of claim 1, wherein the natural gas has a high methane content.

17. The process for refining iron from high-phosphorus content iron ores of claim 1, wherein the reducing gas is obtained from reformed natural gas.

18. A process for refining iron from high-phosphorus content iron ores comprising the steps of:
    mixing a high-phosphorus iron oxide ore and an alkaline solution of pH between about 12.5 and 13.5, wherein a mixture of an alkaline-high-phosphorus solution and a low-phosphorus iron ore solid are obtained;
    screening the mixture by gravity to separate the alkaline-high-phosphorus solution from the low-phosphorus iron ore, wherein the screening step further comprises the steps of:
        screening the low-phosphorus iron ore with a water wash to produced a second diluted alkaline solution containing fine low-phosphorus iron ore particles and low-phosphorus iron ore solid;
        filtering the second diluted alkaline solution to separate fine low-phosphorus particles from the second diluted alkaline solution;
        evaporating the second diluted alkaline solution, wherein the evaporation concentrates the second diluted alkaline solution;
        adding fresh alkaline to the concentrated second diluted alkaline solution until a pH of between about 12.5 and 13.5 is reached; and,
        recycling the alkaline solution of pH between about 12.5 and 13.5 in the mixing step;
    diluting the alkaline-high-phosphorus solution to a pH of between about 11.5 and 12.5, wherein a high-phosphorus solid precipitates from a first diluted alkaline solution; and,
    treating the low-phosphorus iron ore with a natural gas.

19. The process for refining iron from high-phosphorus content iron ores of claim 1 or 18, wherein the mixing step is performed at a mixing speed to produce about 0.8 to about 2.0 kg of iron ore/m²s.

20. A process for refining iron from high-phosphorus content iron ores comprising the steps of:
    mixing a high-phosphorus iron oxide ore and an alkaline solution of pH between about 12.5 and 13.5, wherein a mixture of an alkaline-high-phosphorus solution and a low-phosphorus iron ore solid are obtained, wherein the mixing step is performed at a mixing speed to produce about 0.8 to about 2.0 kg of iron ore/m²s;
    screening the mixture by gravity to separate the alkaline-high-phosphorus solution from the low-phosphorus iron ore;
    diluting the alkaline-high-phosphorus solution to a pH of between about 11.5 and 12.5, wherein a high-phosphorus solid precipitates from a first diluted alkaline solution; and,
    treating the low-phosphorus iron ore with a natural gas.

21. The process for refining iron from high-phosphorus content iron ores of claim 18 or 20, wherein the diluting step comprises the steps of:
    adding water to the alkaline-high-phosphorus solution to form a diluted alkaline-high-phosphorus solution;
    filtering the diluted alkaline-high-phosphorus solution to separate a precipitated high-phosphorus solid from the diluted alkaline-high-phosphorus solution to form a first diluted alkaline solution;
    evaporating the first diluted alkaline solution, wherein the evaporation concentrates the first diluted alkaline solution to form a concentrated first diluted alkaline solution;
    adding fresh alkaline to the concentrated first diluted alkaline solution to form a second alkaline solution of pH of between about 12.5 and 13.5 is reached; and,
    recycling the second alkaline solution of pH between about 12.5 and 13.5 in the mixing step.

22. The process for refining iron from high-phosphorus content iron ores of claim 1 or 20, wherein the screening step further comprises the steps of:
    screening the low-phosphorus iron ore with a water wash to produced a second diluted alkaline solution containing fine low-phosphorus iron ore particles and low-phosphorus iron ore solid;
    filtering the second diluted alkaline solution to separate fine low-phosphorus particles from the second diluted alkaline solution;
    evaporating the second diluted alkaline solution, wherein the evaporation concentrates the second diluted alkaline solution;
    adding fresh alkaline to the concentrated second diluted alkaline solution until a pH of between about 12.5 and 13.5 is reached; and,
    recycling the alkaline solution of pH between about 12.5 and 13.5 in the mixing step of claim 1.

23. A process for refining iron from high-phosphorus content iron ores comprising the steps of:
    mixing a high-phosphorus iron oxide ore and an alkaline solution of pH between about 12.5 and 13.5, wherein a mixture of an alkaline-high-phosphorus solution and a low-phosphorus iron ore solid are obtained, wherein the mixing step is performed at a mixing speed to produce about 0.8 to about 2.0 kg of iron ore/m²s;
    screening the mixture by gravity to separate the alkaline-high-phosphorus solution from the low-phosphorus iron ore;
    diluting the alkaline-high-phosphorus solution to a pH of between about 11.5 and 12.5, wherein a high-phosphorus solid precipitates from a first diluted alkaline solution;
    adding a material selected from the group consisting of quicklime, hydrated lime, calcium carbonate and mixtures thereof to the low-phosphorus iron ore;
    feeding the limed low-phosphorus iron ore to a reduction reactor; and,
    contacting the limed low-phosphorus iron ore with a natural gas to produced a reduced iron ore.

* * * * *